(12) United States Patent
Sasu

(10) Patent No.: US 8,186,249 B2
(45) Date of Patent: May 29, 2012

(54) THREE POINT TURNING MACHINE

(75) Inventor: Ioan Sasu, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 636 days.

(21) Appl. No.: 12/164,788

(22) Filed: Jun. 30, 2008

(65) Prior Publication Data

US 2009/0320656 A1    Dec. 31, 2009

(51) Int. Cl.
 *B23Q 39/00* (2006.01)
 *B23Q 41/08* (2006.01)
(52) U.S. Cl. .......................... 82/1.11; 82/129
(58) Field of Classification Search ............ 82/132, 82/159, 113, 70.2, 1.11; 29/27 C, 564, 50, 29/54
 See application file for complete search history.

(56) References Cited

U.S. PATENT DOCUMENTS

| | | | |
|---|---|---|---|
| 1,664,807 A | 4/1928 | Cole | |
| 3,078,547 A | 2/1963 | Sweet | |
| 3,187,611 A | 6/1965 | Sweet | |
| 3,315,550 A | 4/1967 | Kylin | |
| 3,379,080 A | 4/1968 | Massa | |
| 3,546,988 A * | 12/1970 | Behnke | 82/78 |
| 3,811,346 A | 5/1974 | Nomura | |
| 3,848,489 A | 11/1974 | Santana | |
| 4,265,150 A | 5/1981 | Burford | |
| 4,413,539 A * | 11/1983 | Ishizuka et al. | 82/120 |
| 4,475,421 A * | 10/1984 | Cudnohufsky | 82/138 |
| 4,776,247 A | 10/1988 | Kiya | |
| 5,662,524 A | 9/1997 | Esser et al. | |
| 5,778,504 A | 7/1998 | Ozawa et al. | |
| 5,832,797 A | 11/1998 | Cudnohufsky et al. | |
| 6,286,402 B2 * | 9/2001 | Crudgington et al. | 82/1.11 |
| 6,813,980 B2 * | 11/2004 | Inayama | 82/120 |
| 6,938,313 B2 * | 9/2005 | Viola et al. | 29/33 T |
| 6,964,217 B2 * | 11/2005 | Trautmann | 82/129 |
| 2002/0108475 A1 | 8/2002 | Inayama | |
| 2003/0029287 A1 * | 2/2003 | Judas | 82/158 |
| 2009/0320656 A1 * | 12/2009 | Sasu | 82/129 |

* cited by examiner

*Primary Examiner* — Will Fridie, Jr.
(74) *Attorney, Agent, or Firm* — Norton Rose Canada LLP

(57) ABSTRACT

A turning machine having: a machine frame with a longitudinal axis; a rotary part driver for rotating a part about the longitudinal axis; three tools mounted on the frame, each tool having a radial tool axis transverse the longitudinal axis and each radial tool axis being disposed in a circumferential array spaced apart by substantially 120°; wherein each tool has an independent radial actuator and an independent longitudinal actuator, wherein each tool is movable radially and longitudinally relative to the part and relative to the other two tools.

12 Claims, 13 Drawing Sheets

| Offset | | Zero Offset | Rad & axial offset | | |
|---|---|---|---|---|---|
| | | All Cutters | Cutter # | | |
| | | | #1 | #2 | #3 |
| | Axial | 0 | 0 | $a_1/tgK$ | $2a_1/tgK$ |
| | Radial | 0 | 0 | $a_1$ | $2a_1$ |
| Cutting Conditions | DOC | $DOC_3=DOC_1$ | $DOC_3=3DOC_1$ | | |
| | Feed | $s_3=3 \times s_1$ | $s_3=s_1$ | | |

Fig-7

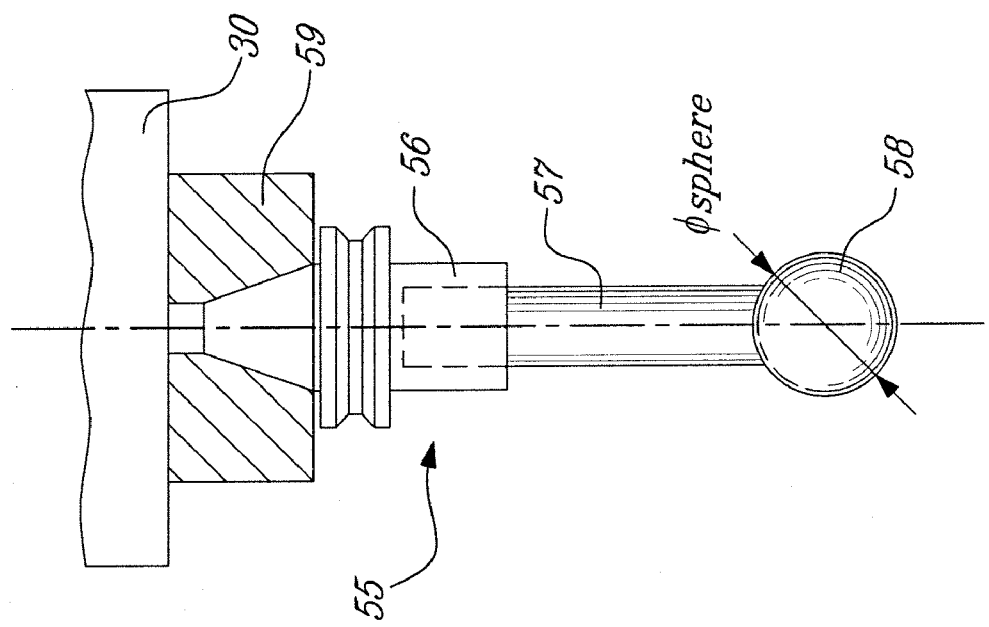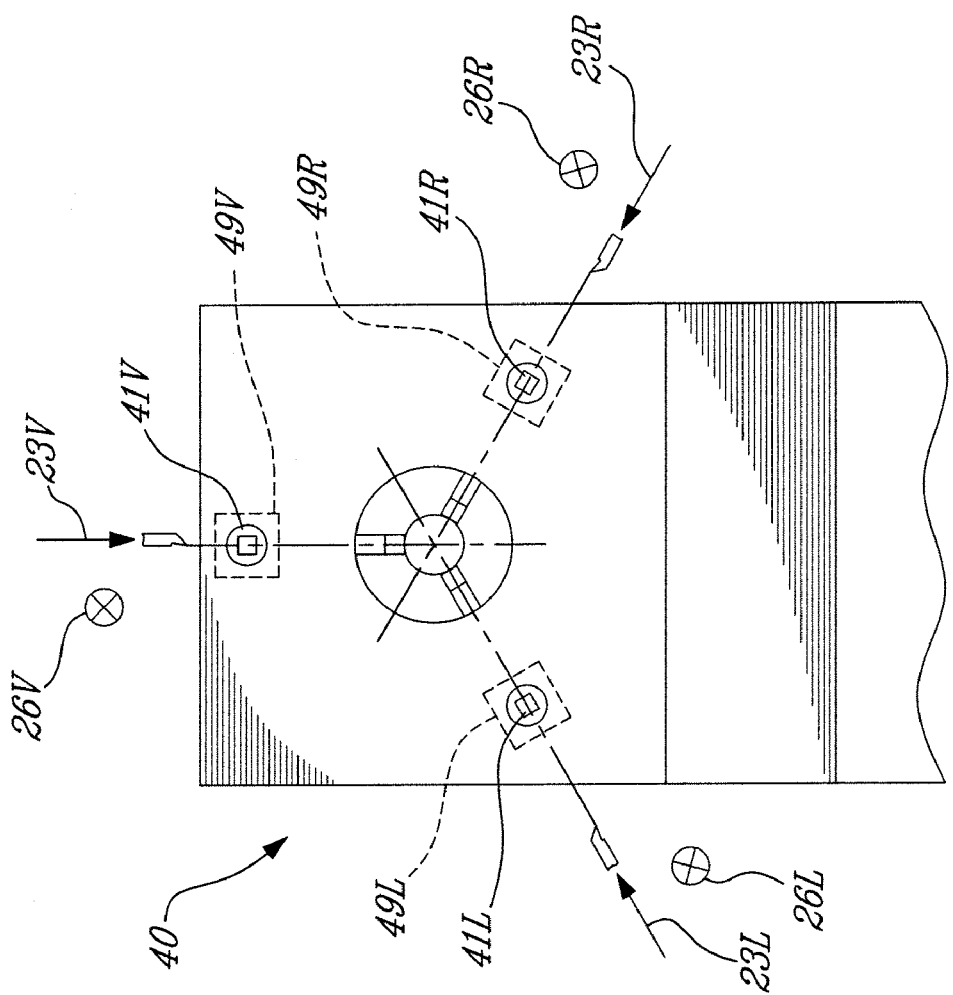

THREE POINT TURNING MACHINE

TECHNICAL FIELD

The present application relates generally to a machine tool such as a turning machine.

BACKGROUND OF THE ART

Turning machines such as lathes, specialized rotary cutters and metal machining tools for example, generally include means to rotate the workpiece or material removing cutters relative to each other. Typically, the workpiece is rotated about its axis while the cutting tools are moved relative thereto in order to remove material as required from the rotating outer surfaces of the part. However, in order to remove material from the workpiece, these cutters necessarily exert forces thereon, and are typically both radial and axially directed. Such forces tend to deflect the workpiece, making proper support of the workpiece essential and often making machining both difficult and time consuming. Ensuring adequate workpiece support is especially important for elongated workpieces, such as those used when machining shafts for example. The turning machine must therefore include steady rollers or supports, which also help provide reaction forces against the applied forces of the cutting tool. Of course, the more flexible the part is, the more critical the need to support the rotating workpiece or part to prevent dimensional inaccuracies and vibrational chatter, which can eventually result in tool wear and material waste. For example, in the case of highly complex geometries machined into the shafts of gas turbine engines, rejected components due to inaccuracies can result in significant expense. The high velocity of the turbine engine shaft imposes a dimensional accuracy required and the high strength and high temperature resistant materials of which the shafts are constructed make machining productivity extremely important. Therefore it is desirable to create a highly accurate turning machine which will permit reduced deflection of workpieces, thereby enabling reduced dynamic vibrations, enhanced reliability, increased productivity, lower manufacturing costs and higher finished part quality.

SUMMARY

In accordance with one aspect, there is provided a turning machine tool comprising: a machine frame having a longitudinal axis; a rotating spindle to which a workpiece is fastenable for rotating said workpiece about a workpiece axis parallel to the longitudinal axis, said rotating spindle being engaged with said machine frame; and three displaceable tool holders mounted on the frame, each tool holder rigidly supporting a cutting tool having a radial tool axis transverse to the workpiece axis, and each radial tool axis being disposed in a circumferential array spaced apart by about 120°, each of said tool holders being independently radially displaceable along said radial tool axis and longitudinally displaceable relative to said workpiece.

There is further provided a method of turning an elongated workpiece using a turning machine tool, comprising: providing the turning machine tool with three cutting tools each defining a radially extending tool axis spaced apart from each other by about 120°; rotating said elongated workpiece about a longitudinal workpiece axis transverse to each said radially extending tool axis; radially displacing said cutting tools along said tool axis towards said longitudinal workpiece axis until cutting surfaces of said cutting tools engage said workpiece; and displacing said cutting tools relative to said workpiece in a direction parallel to said longitudinal workpiece axis, thereby turning said workpiece using said cutting tools engaged thereto at three equally spaced points circumferentially thereabout.

DESCRIPTION OF THE DRAWINGS

In order that the invention may be readily understood, an embodiment is illustrated in the accompanying drawings, in which:

FIG. 7 is a chart showing sample offset setting from the three cutters, for both zero offset and radial and axial offset setups;

FIGS. 9-11 show a tool probing system which may be employed;

FIGS. 12-14 show a tool probing calibration system which may be employed;

Further details will be apparent from the detailed description included below.

DETAILED DESCRIPTION OF PREFERRED EMBODIMENTS

Figure 1:
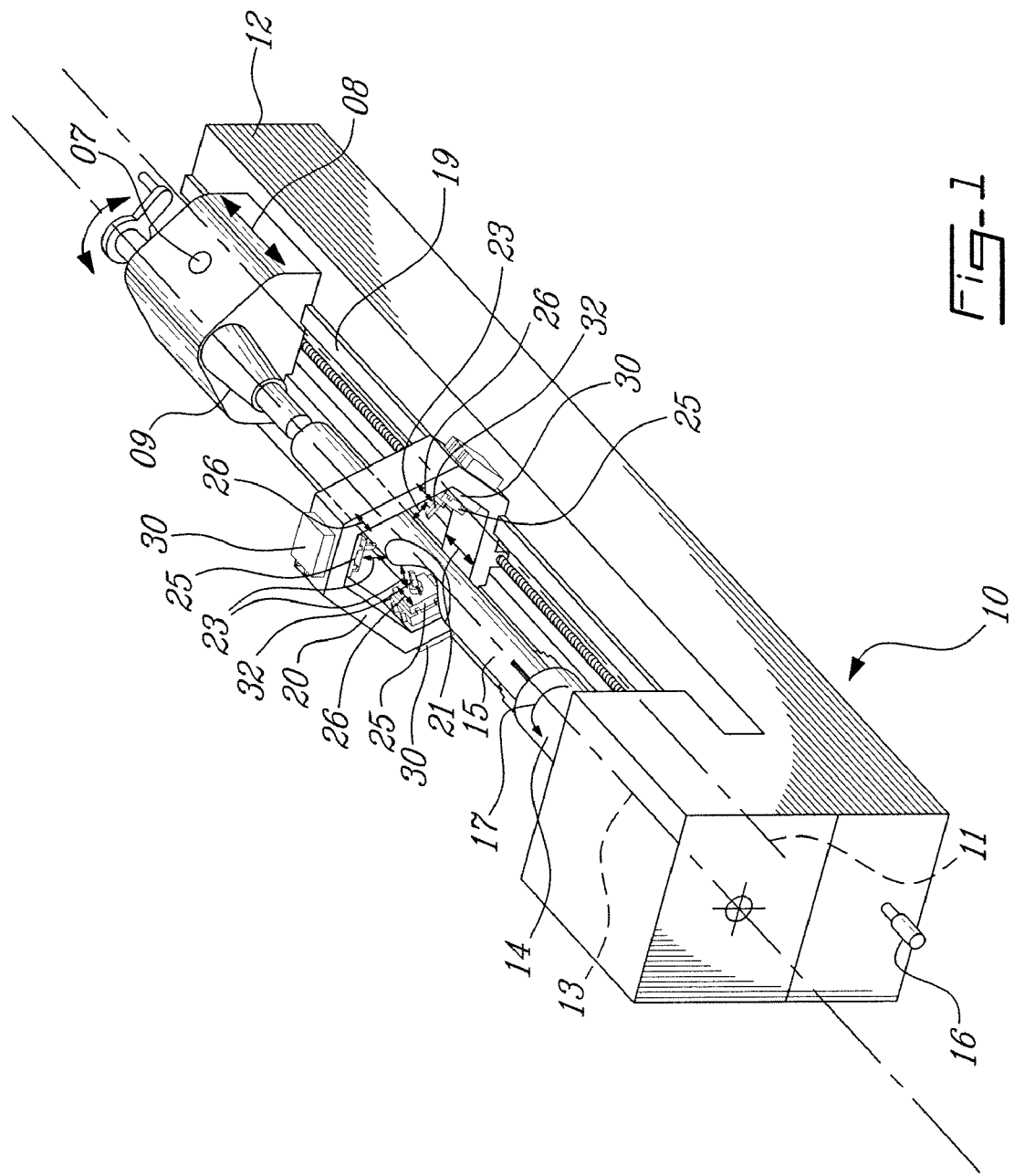
FIG. 1 is a isometric view of a three-point turning machine.

FIG. 1 shows a turning machine, or lathe 10, having a frame 12 with a longitudinal axis 11 in a horizontal position. The rotating spindle 14 includes a jaw portion, which grasps (i.e. rigidly engages) one end of the workpiece 15, such that the workpiece 15 is rotated by the spindle 14 around the longitudinal axis 13 of the workpiece, which is horizontal and parallel to the longitudinal axis 11 of the machine frame. The rotating spindle 14 is driven, by suitable motor 16.

The opposed end of the elongated workpiece 15 is supported by a tailstock 09. The tailstock 09 is mounted on the frame 12 of the machine and is preferably longitudinally displaceable relatively thereto in longitudinal direction 08, moving along guide rails 19 disposed on the frame 12. The tailstock 09 may be located on the frame 12 by an interlocking mechanism 07.

The turning machine 10 further includes a tool supporting carriage 20, which is a close frame structure generally like a hexagon shaped yoke in the embodiment depicted in FIG. 1. The tool carriage 20 is displaceably mounted to the frame base 12 such that the carriage 20 can longitudinally slide in direction 21 relative to the stationary frame 12 and therefore at least relative to the workpiece 15 supported thereby. The direction 21 is parallel to the frame and workpiece axis 11, 13.

The turning machine 10 is particularly adapted for turning elongated workpieces, such as shafts used in gas turbine engines for example. Such parts require a high level of precision and often have complex shapes. Further, such elongated shafts are often hollow and thus relatively flexible. Accordingly, stability of the workpiece is important, as is balancing machining forces of the cutters acting on the part. Accordingly, the turning machine 10 includes three cutting tools, which are equally circumferentially spaced about the workpiece 15 (i.e. spaced 120 degree apart), as will be discussed in further detail bellow.

Figure 2:
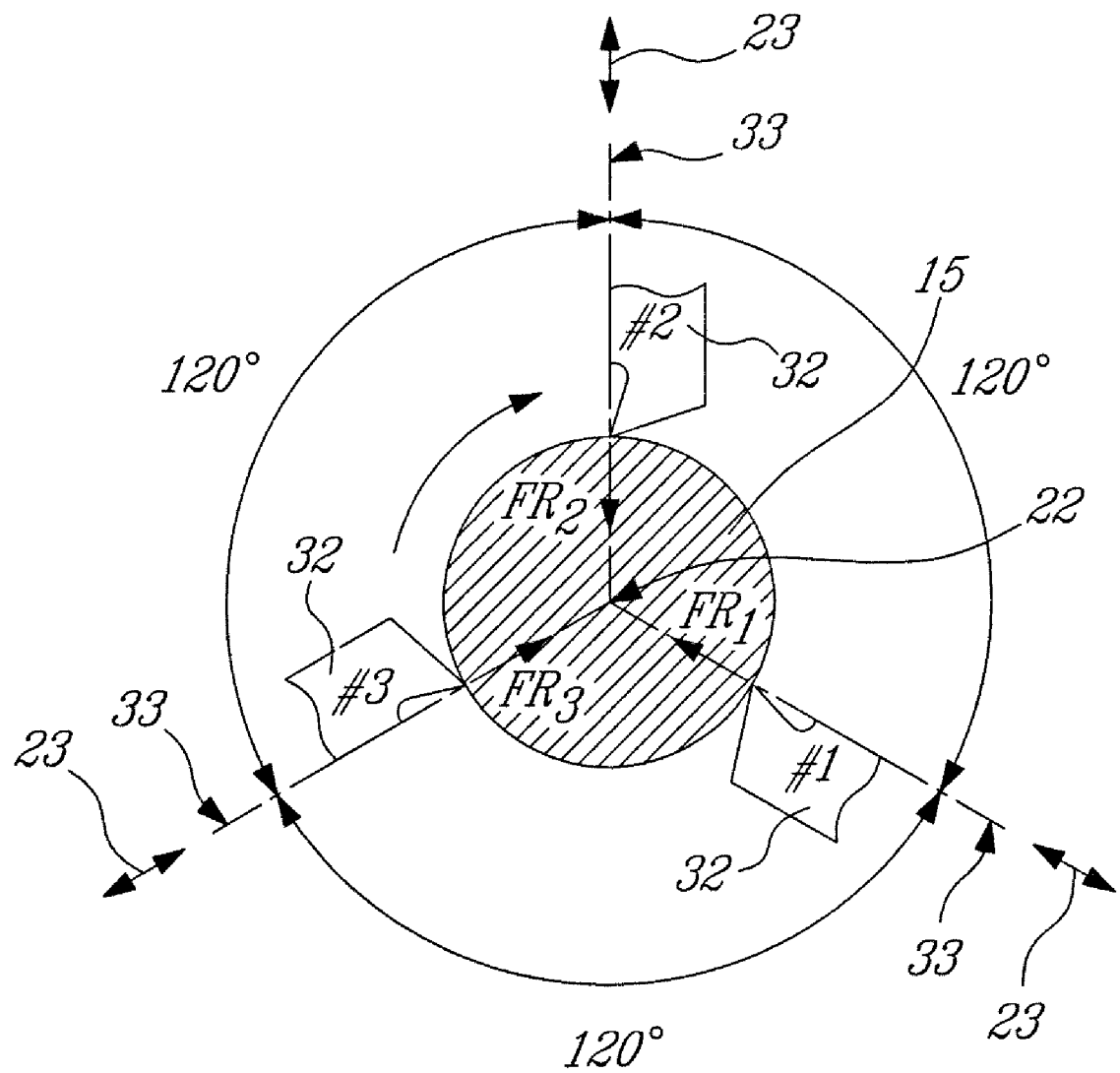
FIG. 2 is a schematic sectional view of the rotating workpiece with orientation of three cutting tool bits about its periphery.

The turning machine 10 of FIG. 1 includes three cutting units 30 mounted to the carriage 20, each activating a cutting tool (cutter) 32 for machining the workpiece 15. The three cutters 32 are equally distributed circumferentially about the rotating workpiece 15, and are therefore spaced 120 degree apart from each other as shown in FIG. 2.

Figure 3:
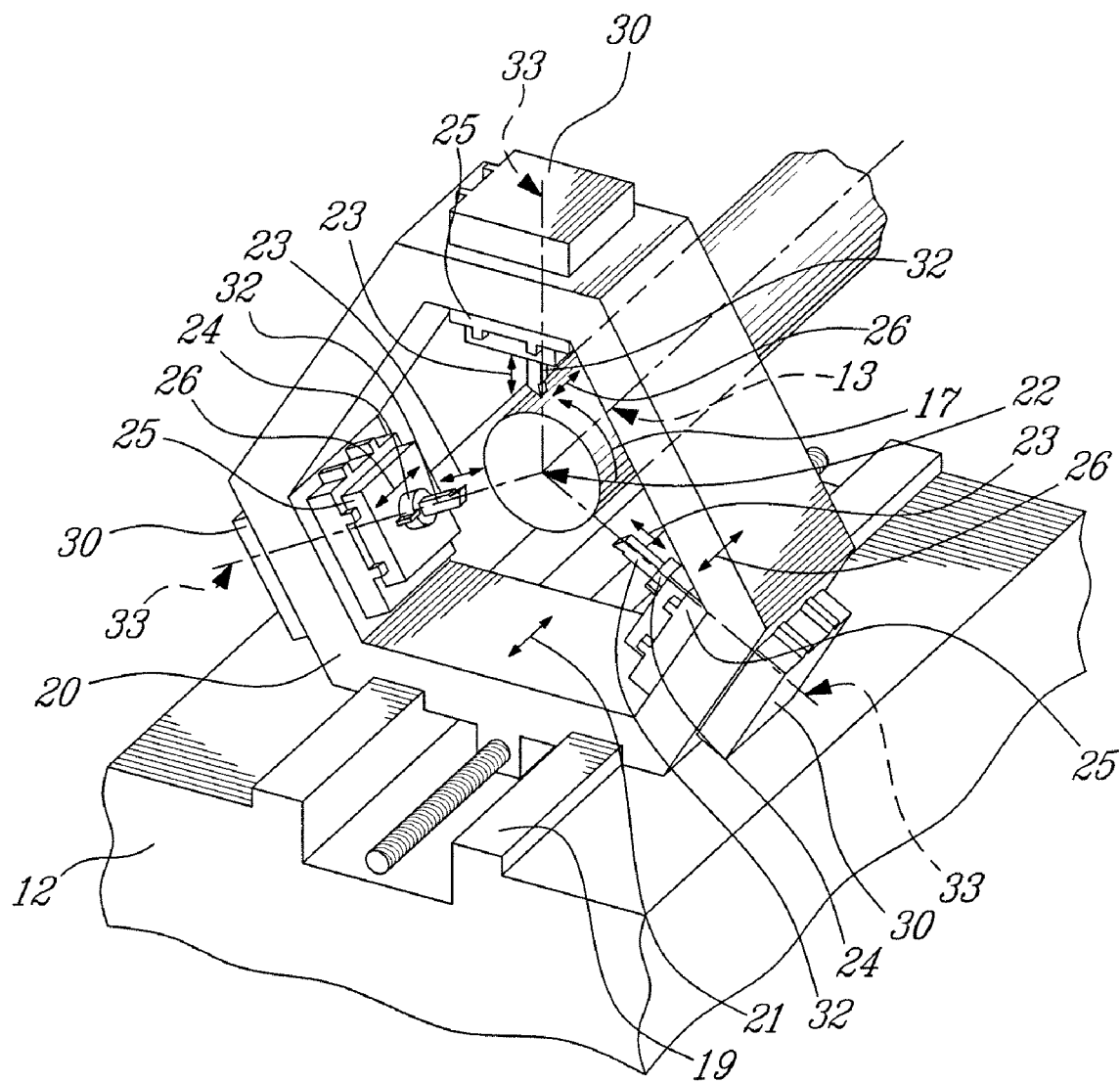
FIG. 3 is an isometric view of a cutting tool unit of a three-point turning machine.
Figure 4:
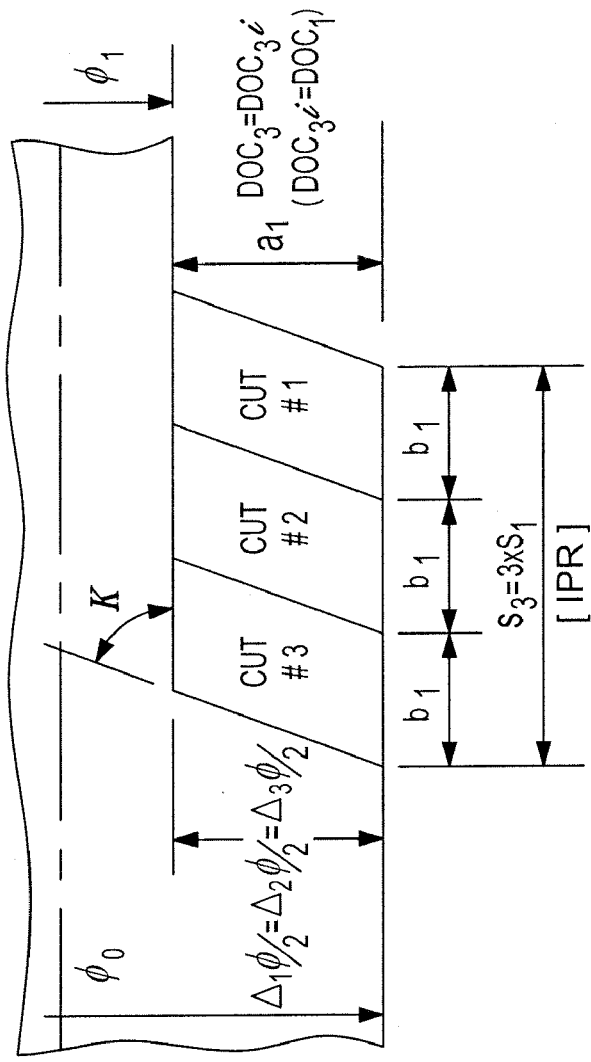
FIG. 4 is a schematic representation of a chip section of a single tool lathe of the prior art.
Figure 8:
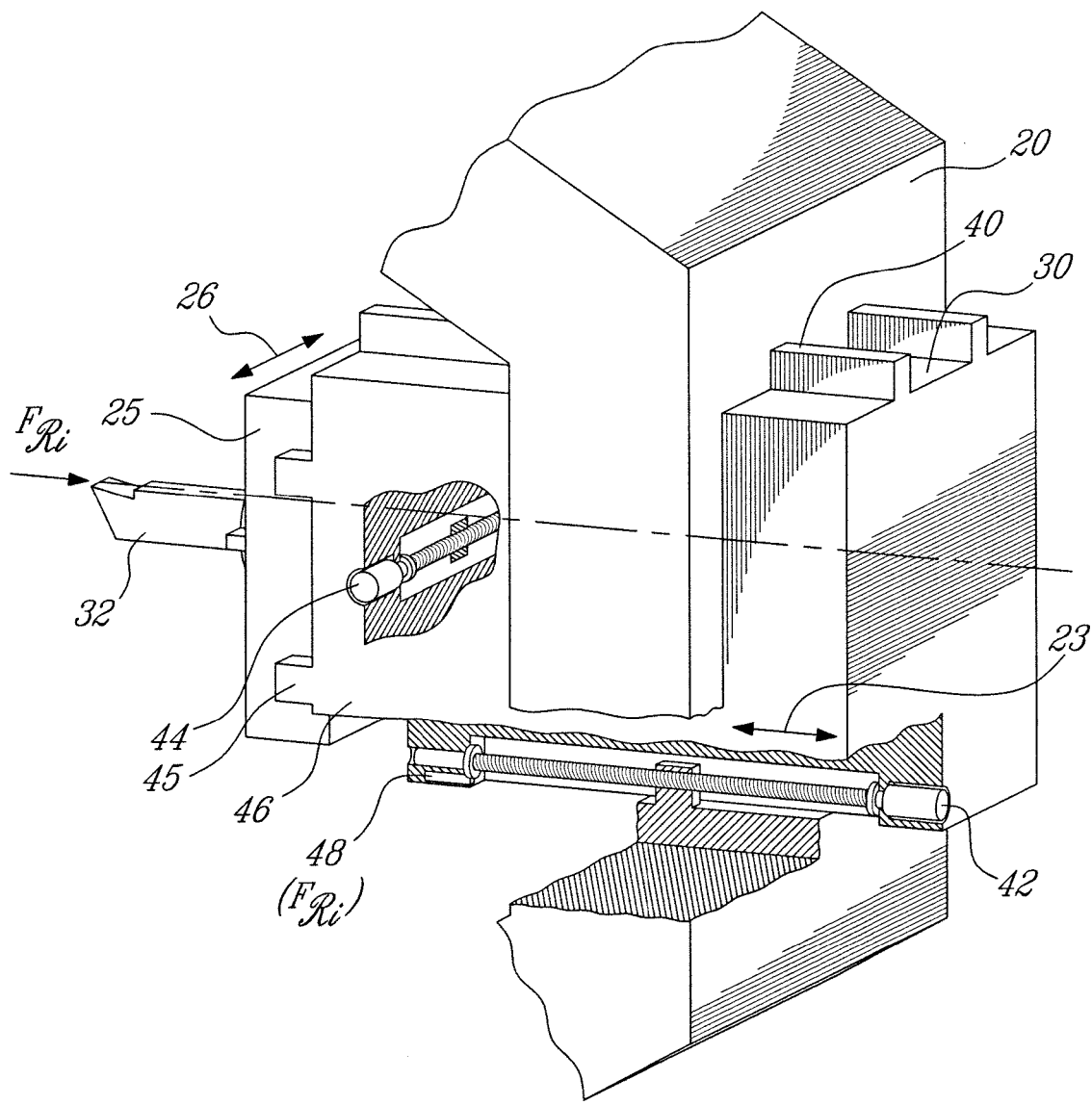
FIG. 8 is a schematic perspective view of a tool holder with radial and longitudinal actuators for displacing the tool bit relative to the supporting carriage of the turning machine of FIG. 1.

Preferably, each cutting tool unit 30 is also independently displaceable in the radial direction 23, relative to the working axis 13, (FIG. 3). As best seen in FIG. 8, each tool unit 30 having cutting tool 32 fixed thereto is displaceable in the radial direction 23 with respect to the carriage 20 on rails 40 by a radial actuator 42 and in a axial direction 26 by a longitudinal actuator 44, which translates the cutting tool 32 via cutter slide 25 on rails 45 disposed on the radial translating body 46 of the cutting unit assembly. To cut different diameters, the cutting units 30 move the cutters 32 along the axis 33 in a radial direction 23 with respect to the workpiece 15, in such a way that all these three axis 33 (one of each cutting unit) intersect in a single point 22 which belong to the workpiece axis 13 (see FIG. 2). This movement allows adjusting the radial position of each cutter 32 in the 23 directions in order to control the cutters radial position with respect to the workpiece axis 13, thus, the part diameter.

The cutters 32 are mounted on the cutting units 30 via a tool holder 24, (see FIG. 3), which is held by a locking mechanism on a cutter slide 25. The said cutter slide 25 can move with respect to the cutting units 30 in the axial direction 26, which is parallel to the workpiece axis 13. This movement allows adjusting the axial position of the cutter 32 in order to control this relative axial position. Thus, the direction 26 is an axial cutter adjustment direction, allowing adjusting the axial offset between the three cutters.

As per all lathes and other turning machines, in order to generate any surface of revolution, the workpiece executes a rotary movement 17 and the cutters execute the adjustment and the feed movements depending on the surface shape.

For example, a cylindrical surface may be generated as follows: a) cutter axial adjustment (on 26 axis)—for zero axial offset between three cutters; b) cutter radial adjustment 23 (on 33 axis)—for the required part diameter; c) workpiece rotation 17 (around 13 axis)—to create the cutting speed [SFM]; and d) carriage 20 axial movement 21—to generate the axial cutters feed [IPM].

In another example, a face normal to the part axis may be generated as follows: a) cutter axial adjustment (on 26 axis)—for zero axial offset between three cutters; b) axial carriage 20 positioning on 21 movement—for the required part length; c) workpiece rotation 17 (around 13 axis), to create the cutting speed [SFM]; d) carriage 20 axial movement 21, to generate the axial cutters feed [IPM].

In another example, a conical shape may be generated as follows: a) cutter axial adjustment (on 26 axis)—for zero axial offset between three cutters; b) workpiece rotation 17 (around 13 axis), to create the cutting speed [SFM]; c) carriage 20 axial movement 21 combined with cutter radial movement 23, to generate the linear cutter feed having with the axial direction 13 the same angle like the part taper shape.

In another example, a surface of revolution of any shape may be generated as follows: a) cutter axial adjustment (on 26 axis), for zero axial offset between three cutters; b) the right combination between the carriage axial movement 21 and the cutters radial movement 23, to generate the right part profile in an axial section.

Figure 5:
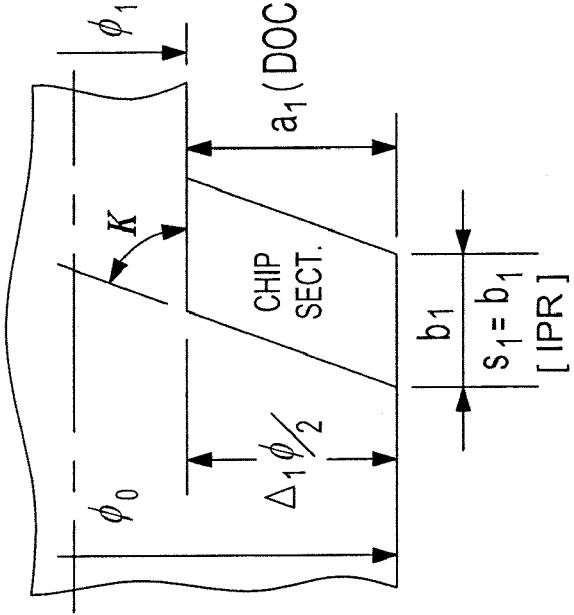
FIG. 5 is a schematic representation of chip sections of the turning machine of FIG. 1, with zero offset between the tool bits.
Figure 6:
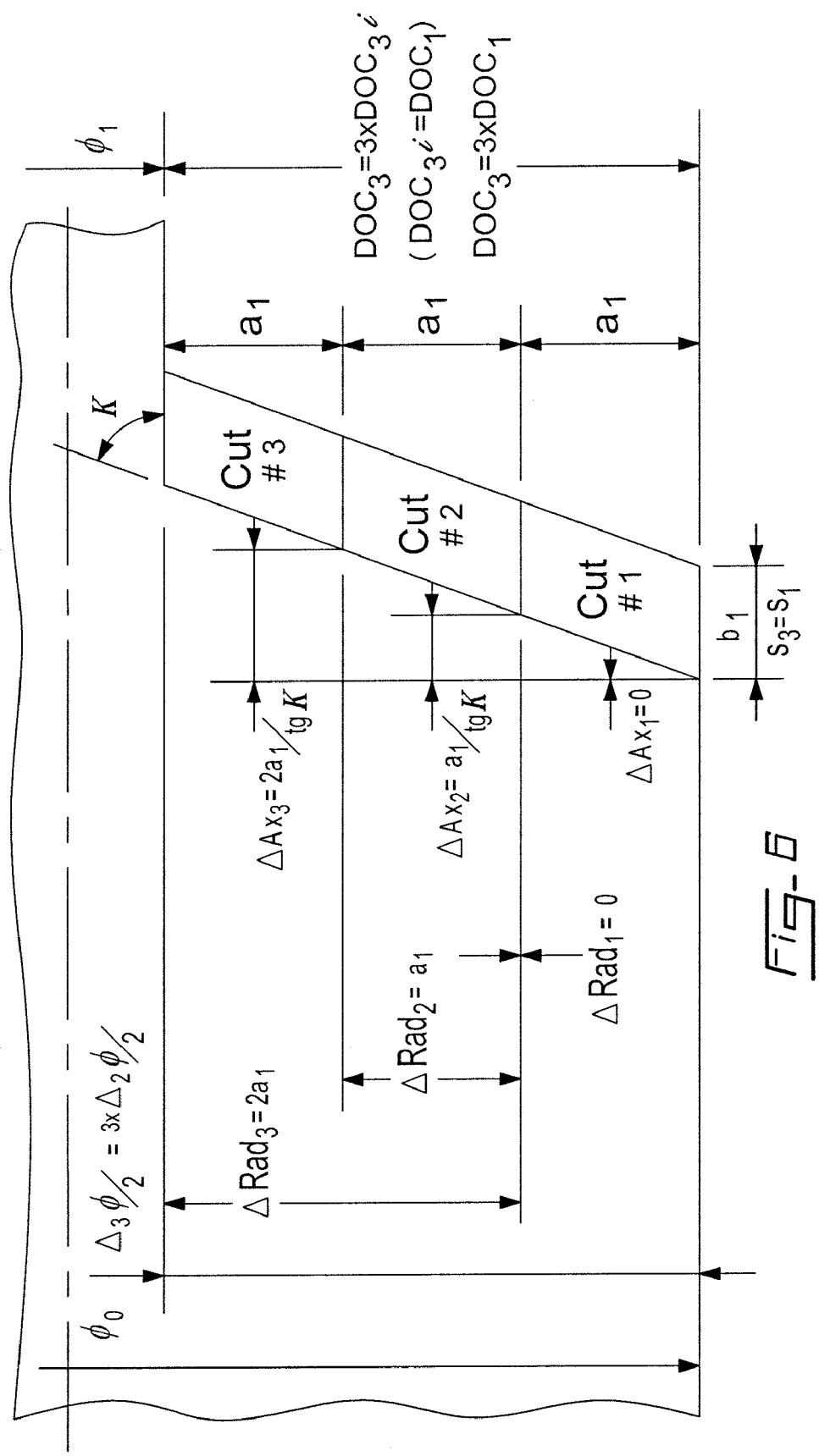
FIG. 6 is a schematic representation of chip sections of the turning machine of FIG. 1, with a radial and axial offset between the tool bits.

As mentioned, three cutters are simultaneously used. Depending on the relative cutter adjustment (in axial 26 and radial 23 directions) different cutting conditions are possible. This is shown in FIGS. 5, 6 & 7 for a very simple example of machining of a cylindrical surface, as will now be described further.

For three point turning, keeping the load of each cutter constant (the same chip section ($a_1$ & $b_1$) as for the simple cutter), there are two different scenarios:

a. Zero cutter offset: (a) Zero radial offset for which the cutters are adjusted to the same diameter (same distance on radial direction 23 with respect to the part axis 13); and (b) Zero axial offset for which the cutters are adjusted to be in the same transversal plane (normal to the part axis 13), which intersects each other in the same point 22 on the part axis 13.

b. Radial and axial offset: (a) Radial cutter offset for the cutter #2 and #3 with the same depth of cut (DOC) like the depth of cut of the single cutter (DOC1); and (b) Axial cutter offset which depends of the DOC and the cutter geometry, more specifically, to the attack angle "κ" ($\Delta Ax = a_1/tg\ \kappa$, (see FIG. 7). For κ=90°, the axial cutter offset becomes zero.

For zero cutter offset (for same cutter load) the productivity increases by a factor of 3 by increasing the feed (see FIGS. 5 & 7). The result is the reduction of the time per pass by a factor of 3, keeping the same number of passes.

For radial and axial cutter offset, (for the same cutter load) the productivity increases by a factor of 3 by increasing the total depth of cut ($DOC_3 = 3*DOC_1$—see FIGS. 6 & 7). The result is the reduction of number of passes by a factor of 3, keeping the same time per pass.

Depending on each application, the process planner can decide which strategy will be the best, and adopt the machining program to this best strategy.

The movement of the carriage 20, the cutting units 30, the cutter slides 25 and all other parts of the turning machine 10 can be suitably controlled using numerical control system such as CNC type control system known in art for machine tools, and will as such not be described in further detail herein.

By a good and accurate control of the cutters position (in axial and radial direction) it is possible to obtain a good dimensional control on the part diameter, length and profile (for complex shapes).

By controlling the cutter offset (in axial and radial position), the load of each cutter is under control, so the radial component of the cutting force $F_{Ri}$ (see FIG. 2). To avoid the part deflection, the radial cutting force $F_{Ri}$ of all three cutters have to be balanced (equals and at 120°).

Accordingly, the turning machine 10 can be used to produce complex shaped surfaces on relatively flexible parts, especially elongated ones such as shafts, by balancing tool loading to reduce deflection of the workpiece and thereby enhance dimensional accuracy. Preferably, in order to control the radial cutting force $F_{Ri}$ and to balance the loading imposed by the cutters 32 on the workpiece, each cutting unit 30, includes a separate load sensor 48 which is operable to measure the load on the cutting tool 32 (see FIG. 8). Each load sensor 48 communicates with a load balancing control system, which may be integrated within the numerical control system of the entire turning machine 10, that controls the actuator 42 or 44 of the cutter slide 30 and 25 for radial and/or longitudinal displacement thereof. Therefore, radial loads applied by the cutters 32 can be measured and balanced accordingly by displacing the exact position of the cutting tools relative to the workpiece in order to be adequately balanced.

The turning machine may further include additional features, such as a tool changing system, a part probing system and/or a tool probing and tool length compensation system.

Figure 10:
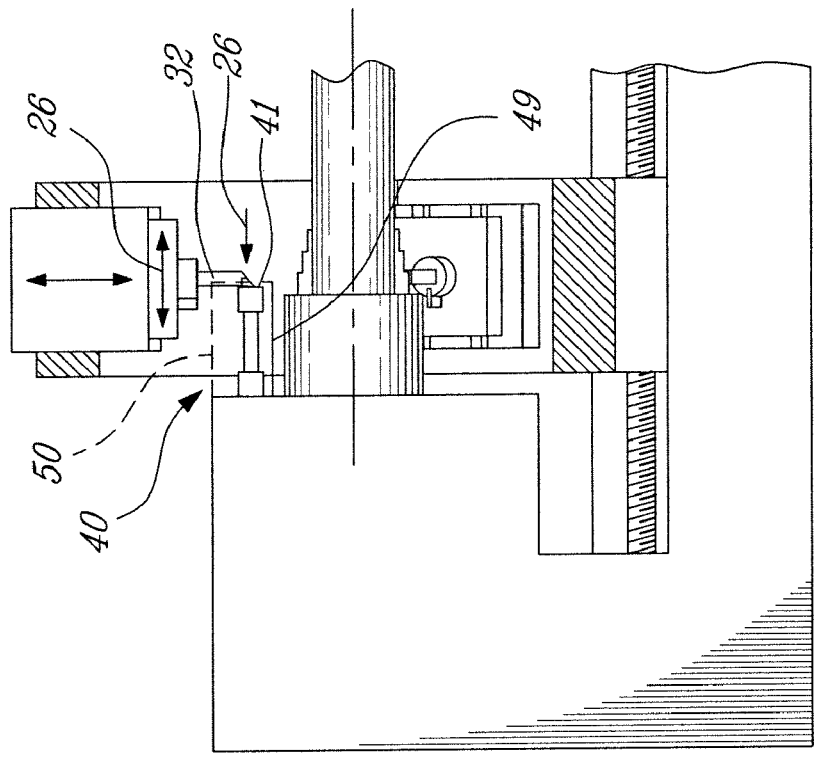
Figure 9:
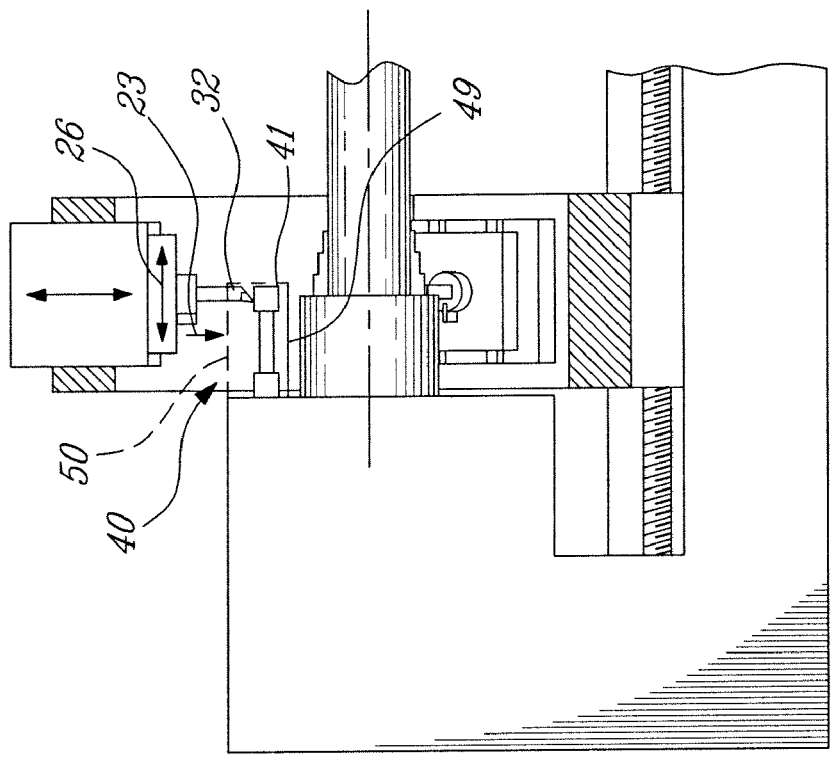

As schematically depicted in FIGS. 9 to 11, the machine 10 may be equipped with a tool probing system 40, comprising for each cutting unit a tool probe 41 (41L, 41V & 41R FIG.11) capable to measure the actual tool length (see FIG. 9) by touching the tool probe in the radial direction 23 (23L, 23V & 23R), and the actual axial tool position (see FIG. 10) by touching the tool probe in the axial direction 26 (26L, 26V, 26R).

The actual length and axial position of each tool is communicated to the controller and automatic compensation will be applied for each of the three cutting units.

Figure 14:
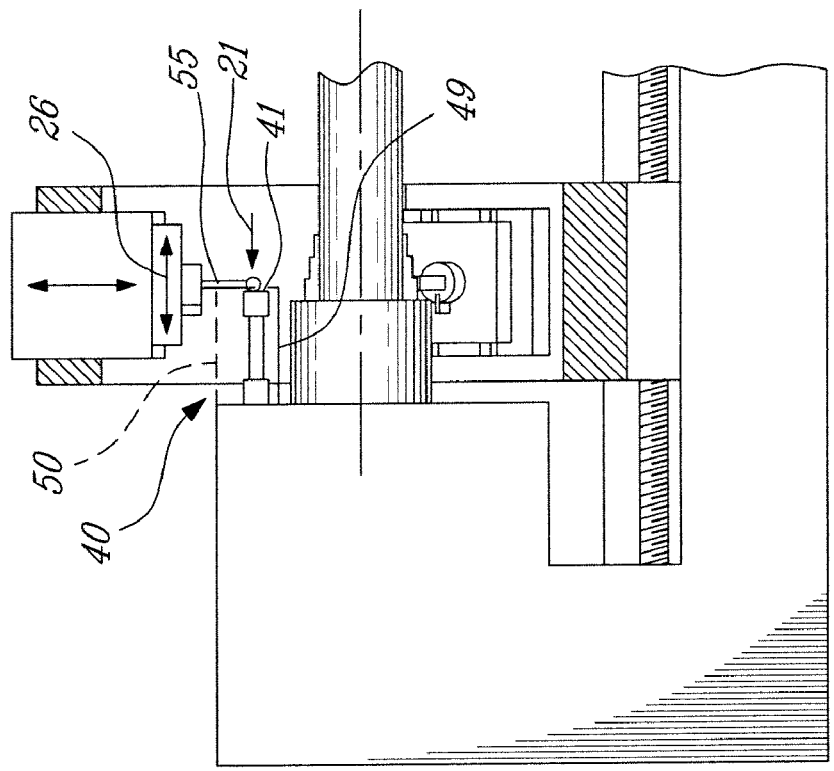
Figure 13:
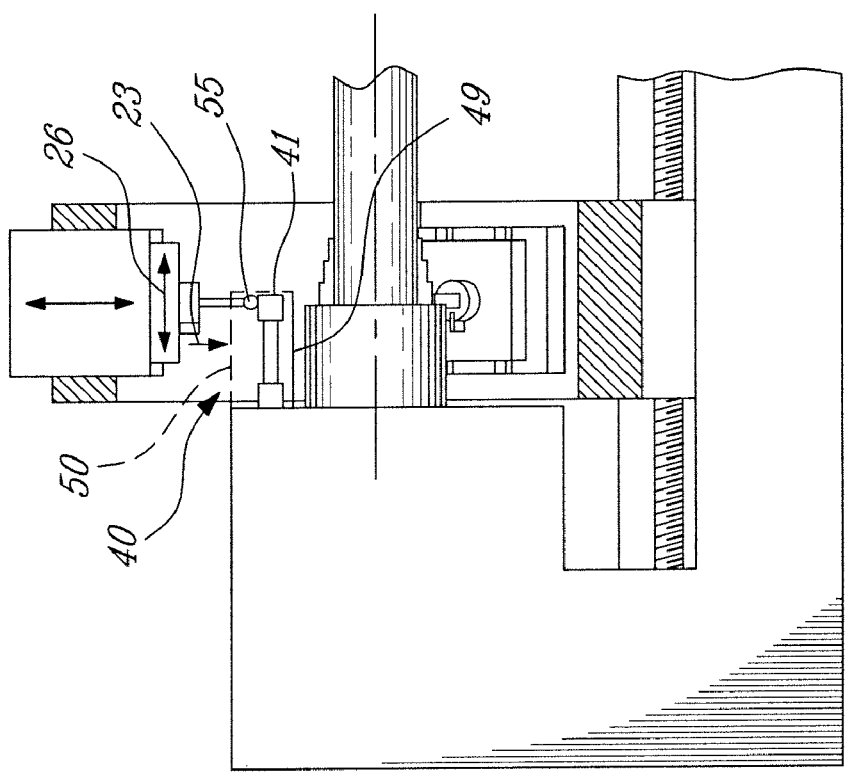

The tool probing system may include a tool probing calibration system (see FIGS. 12-14), which comprises a calibration tool 55 for each unit installed directly into the spindle 59 of each cutting unit by the tool changing system of the machine (as any tool assembly of the tool magazine). This calibration tool 55 comprises a tool holder 56, a bar 57 held into the tool holder 56 and ending in the opposite direction by a ball 58 (FIG. 12). By touching the tool probe 41 in radial direction 23 (23L, 23V, 23R) and in axial direction 26 (26L, 26V, 26R), the system is calibrated.

In order to protect the tool probe 41 during machining, this may be installed into a box 49 having a cover 50 which is closed during machining and is opened during the tool probing and calibration, giving access to touch the tool probe 41 by the cutting tool 32 or by the calibration arm 44.

Figure 16:
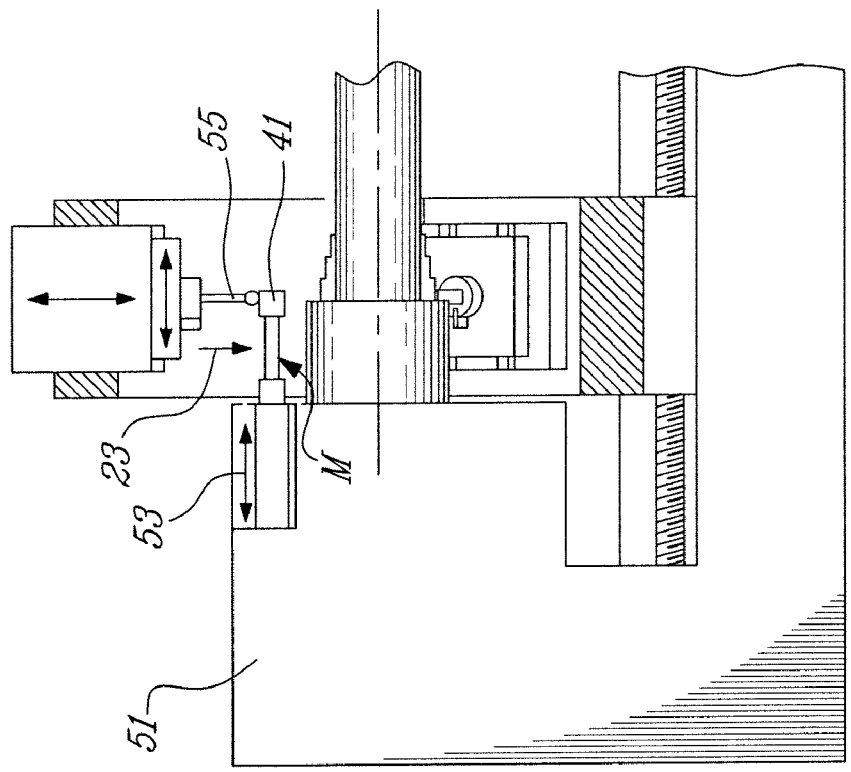
FIGS. 15 and 16 show another tool probing system.
Figure 15:
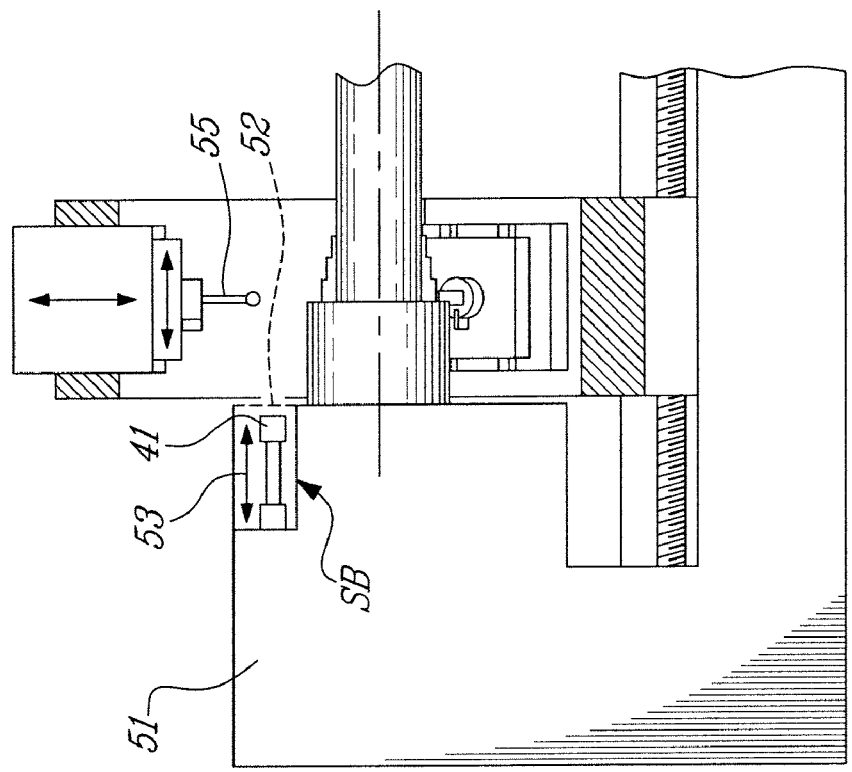

The tool probe 41 also may be protected by installing it into a cavity in the machine body 51, which may be covered by a cover 52 (see FIG. 15). During machining, the tool probe is retracted in position SB (FIG. 15) by the movement 53 and the cover 52 is closed. During the tool measurement, the cover is opened and the tool probe is out of the body cavity in the measurement position "M" (FIG. 16) by the movement 53 in the opposite direction.

Figure 18:
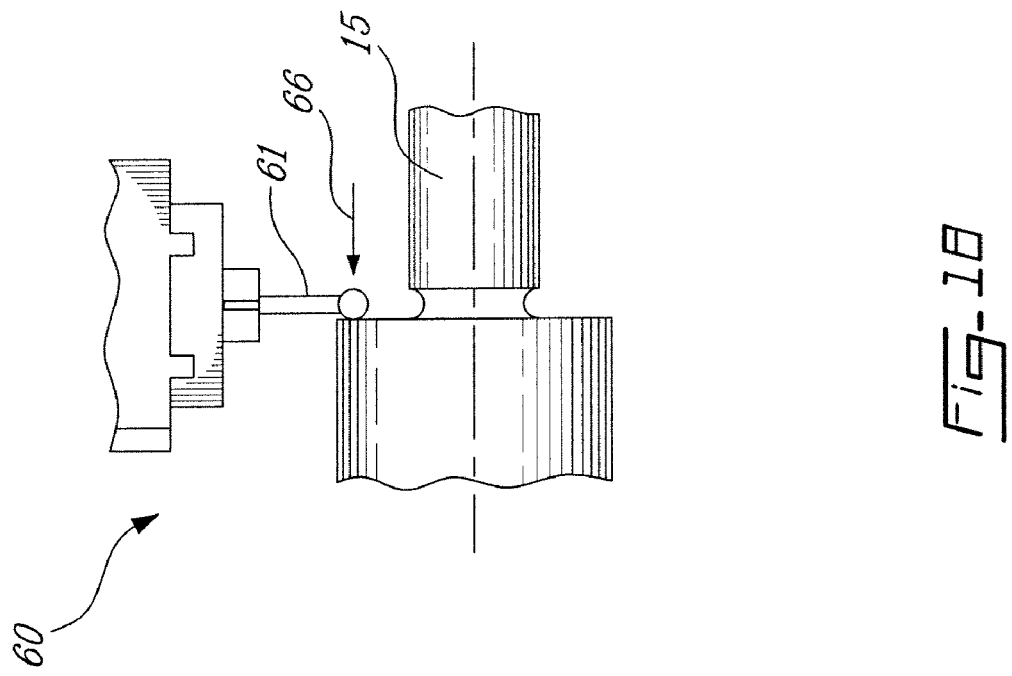
FIGS. 17-19 show a part probing system which may be employed.
Figure 17:
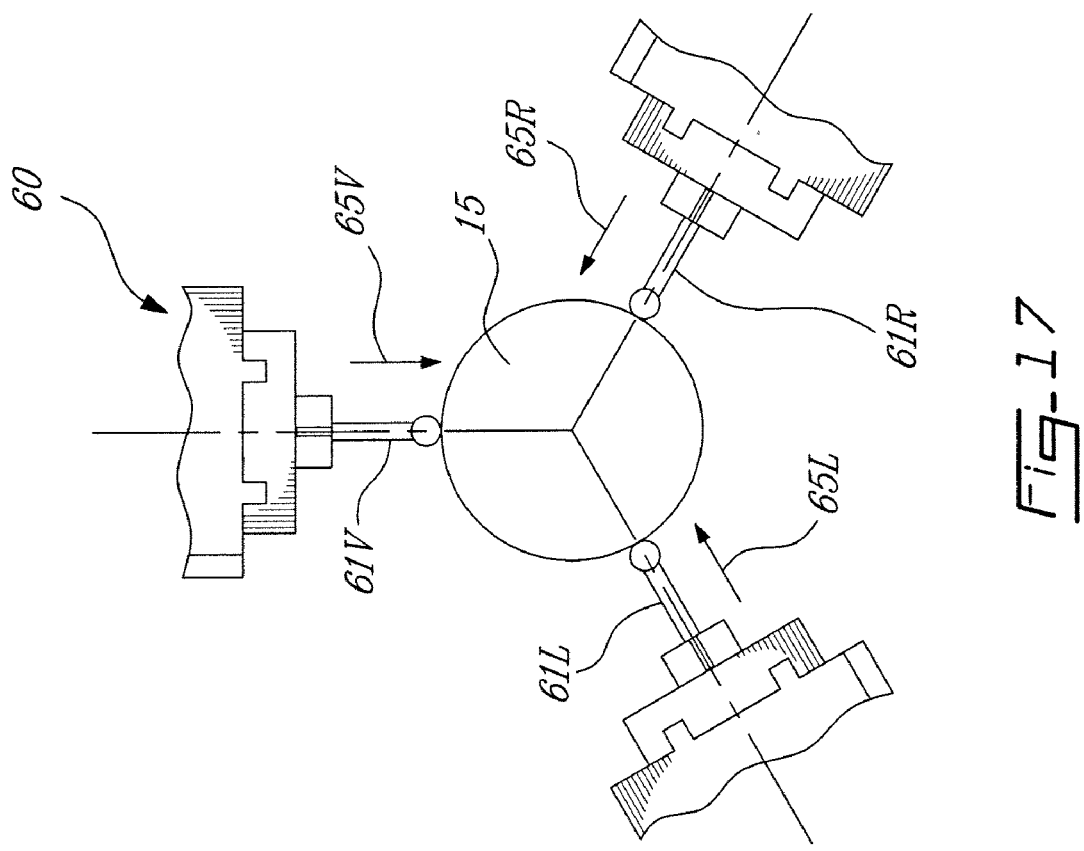
Figure 19:
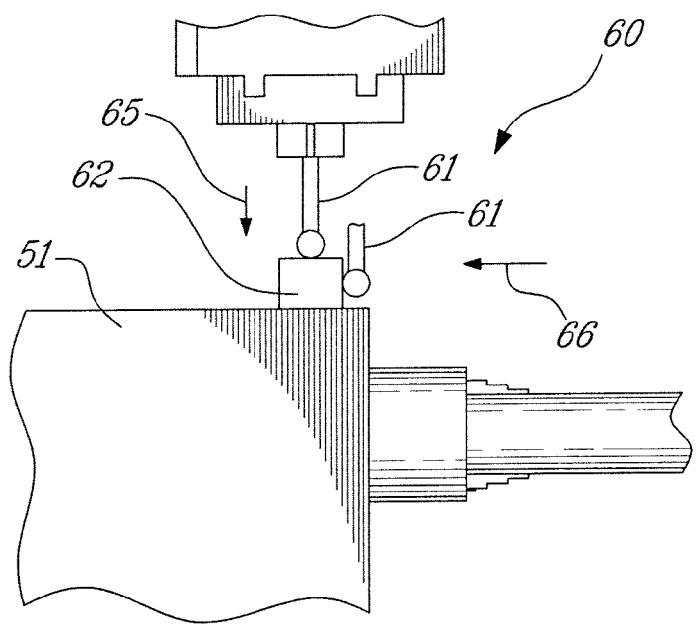

As schematically depicted in FIGS. 17-19, the machine 10 may be equipped with a part probing system 60, comprising for each cutting unit or just for one of them a part probe 61 capable to measure the part diameters by touching the part outside surface approaching by the radial movement 65 or the part axial lengths (distance between different part faces) by touching the part faces approaching by an axial movement 66.

The three part probes (one for each cutting unit) increases the accuracy of diameter measurement and in the fact that this makes possible the measurement of the position of the part in different sections—relative run out and concentricity (eccentricity).

In order to calibrate the part probing system, calibration block gauges 62 are installed on the machine body 51, in an accurate position. The calibration is performed by probing these block gauges in radial direction 63 and in axial direction 64 (see FIG. 19).

Figure 20:
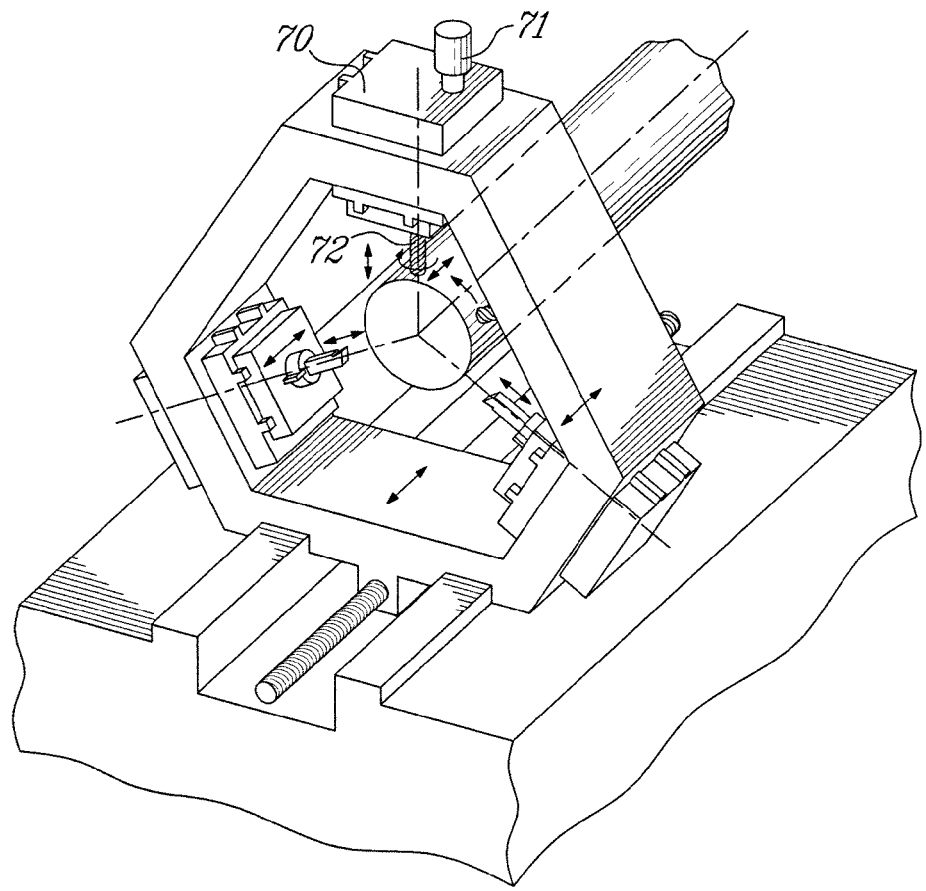
FIG. 20 is an isometric view of a cutting tool unit of another three-point turning machine, handling milling capabilities.

The turning machine 10 further may have one (or more) of the cutting units 30 modified into a turn-mill unit 70, equipped with a motor 71 and the mechanisms capable to activate a milling or drilling cutter 72 (see FIG. 20). This configuration allows the machining of different part features (such slots, holes, etc.) by milling or by drilling, using the same set-up used for turning. This unit may be designed to tilt with respect to the part axis, in order to produce holes or slots at a certain angle.

The turning machine of the present invention can be used to produce highly complex shapes, particularly on elongated workpieces which are prone to deflection, such as flexible shafts or other parts which are usually difficult to manufacture due to deflection of the part during machining. As the cutting bits which simultaneously cut the workpiece, are disposed 120° apart from each other, the cutting forces on the workpiece can be balanced, thereby substantially preventing any radial force unbalance which may cause the workpiece to deflect during the machining process, negatively effecting productivity and cost as well as dimensional accuracy. The elimination of the deflection of elongated workpieces prevents productivity losses which are otherwise caused by traditional turning machines of the prior art, due to the need to reduce the depth of cut or reduce feed or speed to eliminate tool chattering and vibration using such prior art turning machines. Chattering also affects the tools life due to the loads imposed by impact and vibration. The turning machine of the present invention therefore provides higher accuracy due to load balancing between the three spaced apart tools bits, and use of three tool bits together simultaneously increases the productivity of the machining operations. The three tools bits can be displaced both radially and longitudinally substantially independently for more flexibility and accuracy during machining. The machine may be equipped with one mill-drill unit, being capable of generating different other features in the same set-up used for the turning operation.

Although the above description relates to a specific preferred embodiment, it will be understood that the invention in its broad aspect includes mechanical and functional equivalents of the elements described herein.

I claim:

1. A turning machine tool comprising:
   a single machine frame having a longitudinal axis;
   a rotating spindle to which a workpiece is fastenable for rotating said workpiece about a workpiece axis parallel to the longitudinal axis, said rotating spindle being engaged with said machine frame; and
   only three displaceable tool holders mounted on the frame, each tool holder rigidly supporting a cutting tool having a radial tool axis transverse to the workpiece axis, and each radial tool axis being disposed in a circumferential array spaced apart by about 120°, each of said tool holders being independently radially displaceable along said radial tool axis and longitudinally displaceable relative to said workpiece, wherein the three displaceable tool holders are simultaneously actuated such as to bring the three cutting tools into simultaneous contact with the workpiece, and wherein at least one load sensor is operable to measure a load applied to each of said cutting tools.

2. The turning machine tool as defined in claim 1, wherein each of said tool holders has an independent radial actuator and an independent longitudinal actuator, wherein each cutting tool disposed within each tool holder is independently movable radially and longitudinally relative to the workpiece and relative to the other two cutting tools.

3. The turning machine tool as defined in claim 1, wherein the radial tool axis of said cutting tools intersect with each other at said workpiece axis.

4. The turning machine tool as defined in claim 1, wherein each of said tool holders includes at least one of said load sensors operable for measuring the load applied to the cutting tool retained by said each of said tool holders.

5. The turning machine tool according to claim 4 including a load balancing control system in communication with each of said load sensors and each of the radial and longitudinal actuators.

6. The turning machine tool according to claim 1 wherein the frame includes a tool carriage to which the three tool holders are mounted and a bed to which said rotating spindle is mounted in fixed relative longitudinal engagement, said tool carriage being longitudinally displaceable relative to said bed such that the tool carriage is selectively positionable longitudinally relative to the workpiece.

7. The turning machine tool as defined in claim 6, wherein said bed is longitudinally displaceable relative to both said frame and said tool carriage.

8. The turning machine tool according to claim 6 wherein the tool carriage comprises a U-shaped yoke substantially surrounding a periphery of the workpiece in a plane transverse to said longitudinal axis.

9. The turning machine tool according to claim 1, further comprising a tool probe selectively engageable to one of said tool holders.

10. The turning machine tool according to claim 1, wherein said cutting tool mounted within each said tool holder is selectively disengageable therefrom and replaceable with another cutting tool.

11. The turning machine tool according to claim 10, further comprising an automated tool changing device engaged to said machine frame and operable to automatically remove and re-engaged said cutting tools from said tool holders.

12. A method of turning an elongated workpiece using a turning machine tool, comprising:
   providing the turning machine tool with three cutting tools each defining a radially extending tool axis spaced apart from each other by about 120°;
   rotating said elongated workpiece about a longitudinal workpiece axis transverse to each said radially extending tool axis;
   radially displacing said three cutting tools along said tool axis towards said longitudinal workpiece axis until cutting surfaces of said three cutting tools simultaneously engage said workpiece; and
   displacing said cutting tools relative to said workpiece in a direction parallel to said longitudinal workpiece axis; and
   turning said workpiece using said cutting tools engaged thereto at three equally spaced points circumferentially thereabout, including measuring a load applied to each of said cutting tools using at least one load sensor.

* * * * *